(12) United States Patent
Kikuchi et al.

(10) Patent No.: US 12,221,291 B2
(45) Date of Patent: Feb. 11, 2025

(54) CONVEYANCE SYSTEM

(71) Applicant: TOYO SEIKAN CO., LTD., Tokyo (JP)

(72) Inventors: Takayuki Kikuchi, Yokohama (JP); Junichi Takada, Yokohama (JP); Kazuhiko Nakayama, Yokohama (JP); Taketoshi Manou, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 18/361,259

(22) Filed: Jul. 28, 2023

(65) Prior Publication Data

US 2024/0017935 A1 Jan. 18, 2024

Related U.S. Application Data

(63) Continuation of application No. PCT/JP2022/006070, filed on Feb. 16, 2022.

(30) Foreign Application Priority Data

Mar. 1, 2021 (JP) ................. 2021-031502

(51) Int. Cl.
*B65G 43/08* (2006.01)
*B07C 5/342* (2006.01)
(Continued)

(52) U.S. Cl.
CPC .............. *B65G 43/08* (2013.01); *B07C 5/342* (2013.01); *B65G 47/68* (2013.01); *B65G 47/91* (2013.01);
(Continued)

(58) Field of Classification Search
CPC ........ B65G 43/08; B65G 47/68; B65G 47/91; B65G 2203/0225; B65G 2203/044;
(Continued)

(56) References Cited

U.S. PATENT DOCUMENTS

2013/0260448 A1* 10/2013 Wilson .................. G01B 11/14
356/614
2020/0095067 A1* 3/2020 Berger ................. B65G 47/244
(Continued)

FOREIGN PATENT DOCUMENTS

JP 6-331333 A 12/1994
JP 2008-215955 A 9/2008
(Continued)

OTHER PUBLICATIONS

International Preliminary Report on Patentability (with translation of Written Opinion) dated Aug. 29, 2023, issued in International Application No. PCT/JP2022/006070.
(Continued)

*Primary Examiner* — Jacob S. Scott
*Assistant Examiner* — Miraj T. Patel
(74) *Attorney, Agent, or Firm* — Sughrue Mion, PLLC

(57) ABSTRACT

A conveyance system including a conveyance device configured to convey, with a plurality of containers having a bottomed cylindrical shape arranged in a conveyance direction and in a width direction orthogonal to the conveyance direction, the containers in the conveyance direction, an imaging device configured to capture images of the containers that are being conveyed by the conveyance device, and a detection device configured to detect, by using the images, a container not having a predetermined posture of a plurality of the containers that are being conveyed.

15 Claims, 6 Drawing Sheets

(51) Int. Cl.
*B65G 47/68* (2006.01)
*B65G 47/91* (2006.01)

(52) U.S. Cl.
CPC ............... *B65G 2203/0225* (2013.01); *B65G 2203/044* (2013.01)

(58) Field of Classification Search
CPC ...... B65G 47/256; B65G 47/24; B07C 5/342; G01N 21/84
See application file for complete search history.

(56) References Cited

U.S. PATENT DOCUMENTS

| | | |
|---|---|---|
| 2020/0189855 A1 | 6/2020 | Muehlberger et al. |
| 2023/0005127 A1* | 1/2023 | Awiszus ............ G06F 18/24133 |

FOREIGN PATENT DOCUMENTS

| | | |
|---|---|---|
| JP | 2010-36089 A | 2/2010 |
| JP | 2019-73374 A | 5/2019 |
| JP | 2020-199444 A | 12/2020 |

OTHER PUBLICATIONS

International Search Report (PCT/ISA/210) dated Apr. 26, 2022 issued by the International Searching Authority in International Application No. PCT/JP2022/006070.

\* cited by examiner

CONVEYANCE SYSTEM

CROSS-REFERENCE TO RELATED APPLICATIONS

This application is a continuation application of International Application No. PCT/JP2022/006070, filed Feb. 16, 2022, the disclosure of which is incorporated herein by reference in its entirety. Further, this application claims priority from Japanese Patent Application No. 2021-031502, filed Mar. 1, 2021, the disclosure of which is incorporated herein by reference in its entirety.

TECHNICAL FIELD

The disclosure relates to a conveyance system.

BACKGROUND

In a manufacturing line of a cylindrical container for storing, for example, beverage or food, the cylindrical container is configured to be conveyed in a predetermined posture, such as standing. However, such a container may, for example, fall over due to some reason and may not have a predetermined posture. In such a case, the container not having the predetermined posture needs to be rejected from the manufacturing line.

For example, JP 2019-73374 A discloses a technique according to a conveyance device that conveys cylindrical containers by guiding the containers upright along a guiding member of a conveyance path and can eject a fallen container. This conveyance device includes a sensor that detects the fallen container, an opening portion through which the fallen container is ejected from the conveyance path, and a movable member that opens or closes the opening portion. When the sensor detects the fallen container, the opening portion is opened by the movable member, and the fallen container is ejected from the conveyance path.

SUMMARY

The conveyance device disclosed in JP 2019-73374 A conveys containers in a row, and thus the postures of the containers are relatively easily detected by the sensor. In a manufacturing line related to the containers, the containers arranged on a conveyance surface having a width may be conveyed, and in such a case, detection of the postures of the containers may be required.

An object of the disclosure is to easily and accurately detect a container not having a predetermined posture of containers that are being conveyed by a conveyance device.

According to an aspect of the disclosure, a conveyance system includes: a conveyance device configured to convey, with a plurality of containers having a bottomed cylindrical shape arranged in a conveyance direction and in a width direction orthogonal to the conveyance direction, the containers in the conveyance direction; an imaging device configured to capture an image of the containers that are being conveyed by the conveyance device; and a detection device configured to detect, by using the image, a container not having a predetermined posture of the plurality of containers that are being conveyed.

The disclosure can easily and accurately detect a container not having a predetermined posture of containers that are being conveyed by a conveyance device.

DESCRIPTION OF EMBODIMENTS

An embodiment will be described with reference to the drawings. The present embodiment relates to a conveyance system including a conveyance device configured to convey a plurality of containers having a bottomed cylindrical shape. In this conveyance system, an image of the containers that are being conveyed is captured, and a container not having a predetermined posture of the plurality of containers that are being conveyed is detected by using the captured image. The detected container not having the predetermined posture is rejected from the conveyance device.

System Configuration

Figure 1A:
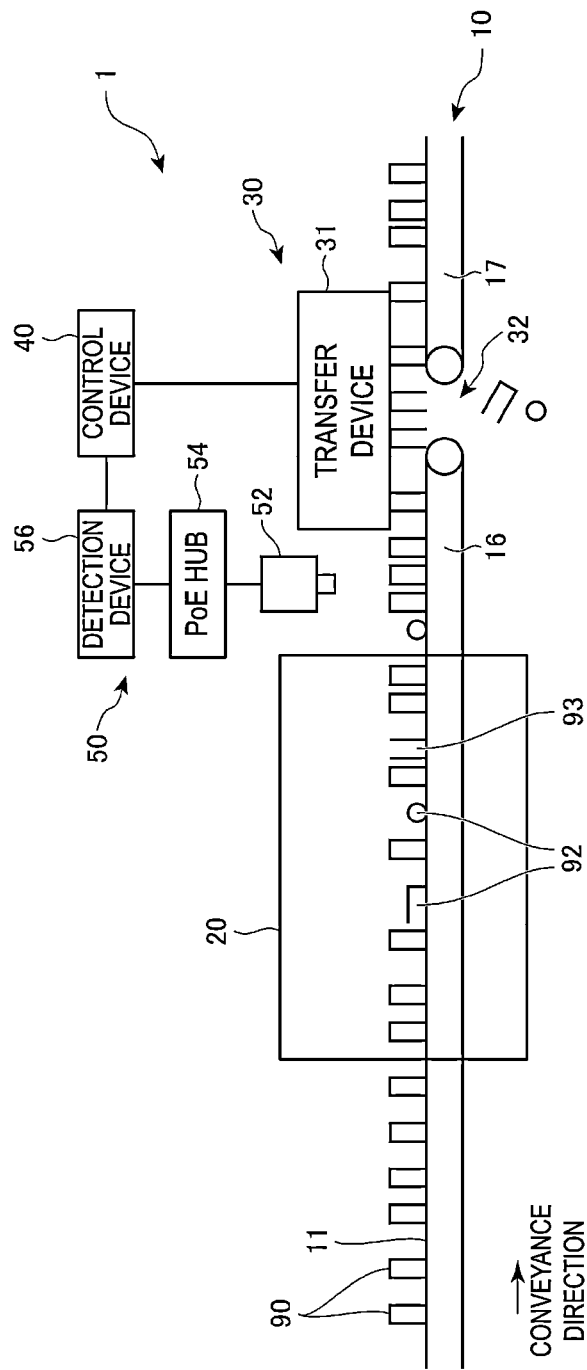
FIG. 1A is a front view schematically illustrating a configuration example of a conveyance system according to an embodiment.
Figure 1B:
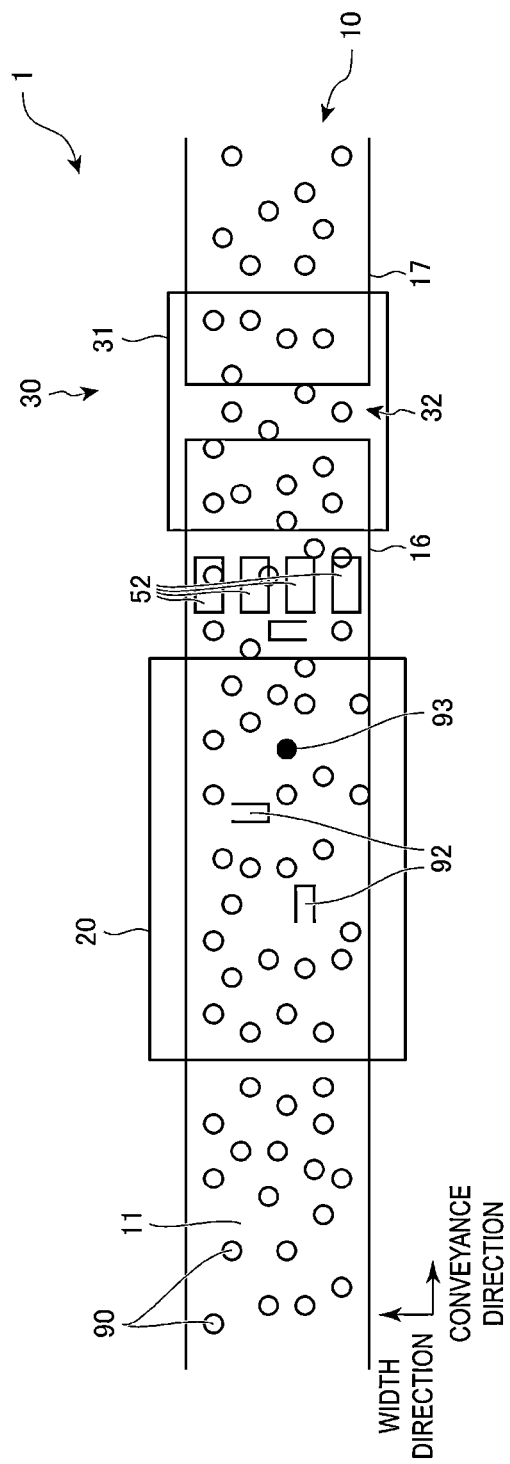
FIG. 1B is a plan view schematically illustrating a configuration example of a conveyance system according to an embodiment.

FIG. 1A is a front view schematically illustrating a configuration example of a conveyance system 1 according to the present embodiment. FIG. 1B is a plan view schematically illustrating a configuration example of the conveyance system 1 according to the present embodiment. The example illustrated here is part of a can manufacturing line. Cans 90 in the process of manufacture are conveyed in a conveyance direction that is from left to right in the drawings. In an example here, the can 90 that are being conveyed has a can body thinly stretched by a drawing process while using a coolant in a body maker, a bottom portion thereof is shaped, and then the height of the can is adjusted by cutting away its unnecessary portion.

The conveyance system 1 includes a conveyance device 10. The conveyance device 10 is, for example, a conveyor such as a belt conveyor or a slat conveyor, and has, for example, a shape of a platform continuously extending in a belt-like shape in the conveyance direction. An upper surface of the platform serves as a conveyance surface 11, and the cans 90 are placed on the conveyance surface 11. The conveyance surface 11 moving along the conveyance direction causes the conveyance device 10 to convey the cans 90 in the conveyance direction. In this example, the cans 90 have a bottomed cylindrical shape. The cans 90 are placed on the conveyance surface 11 essentially in an inverted posture with a bottom facing upward, and the conveyance device 10 is configured to convey the cans 90 in this posture. In the present embodiment, a direction orthogonal to the conveyance direction is a width direction, a plurality of the cans 90 is irregularly arranged on the conveyance surface 11 in the conveyance direction and in the width direction, but the configuration is not limited to the embodiment.

The conveyance device 10 is provided with a washer machine 20. The washer machine 20 is a device that washes away the coolant attached to the cans 90 and dries the cans 90. The washer machine 20 is configured to perform a washing process including a process of washing the cans 90 by spraying a wash fluid onto the cans 90 that are being conveyed by the conveyance device 10. Thus, the washer machine 20 is a type of spraying device that sprays a fluid.

The cans 90 that should stand in the inverted posture on the conveyance surface 11 may fall over or stand in a reversed posture in the washer machine 20, for example, in the process of spraying the wash fluid. The conveyance system 1 of the present embodiment includes a detection system 50 that detects a can having an abnormal posture other than a normal can 91 that stands in the inverted state on the conveyance surface 11, such as a fallen can 92 that has fallen over or a reversed can 93 that stands upright.

The detection system 50 detects the fallen can 92, the reversed can 93, or the like in accordance with an image of the cans 90 that are being conveyed by the conveyance device 10. Thus, the detection system 50 includes an imaging device 52 provided downstream of the washer machine 20. The imaging device 52 is configured to be able to capture an image of the entire width direction of the conveyance surface 11. The image of the entire width direction may be captured by a plurality of the imaging devices 52. The image of the cans 90 that are being conveyed by the conveyance device 10 is acquired by using the imaging device 52. The imaging device 52 is connected to, for example, a Power over Ethernet (PoE) hub 54, but may be connected to other type of hub. The imaging device 52 is supplied with power from the PoE hub 54, and transmits the captured image via the PoE hub 54.

The detection system 50 includes a detection device 56. The detection device 56 is a computer including an integrated circuit, such as a field programmable gate array (FPGA), an application specific integrated circuit (ASIC), or a central processing unit (CPU), and may be equipped with, for example, a graphics processing unit (GPU). The detection device 56 acquires the captured image from the imaging device 52 via the PoE hub 54. The detection device 56 detects, by using the acquired image, the can 90 not having a normal posture such as the fallen can 92 or the reversed can 93.

In an example, the detection device 56 of the present embodiment implements a machine-learned model configured to detect the can 90 not having the normal posture. This model is a model generated by, for example, supervised learning using deep learning but may be a model generated by other type of learning. Teaching data to be used includes an image of only the plurality of normal cans 91, an image of the fallen can 92 included in the plurality of normal cans 91 along with the coordinates of the fallen can 92 and information indicating that it is the fallen can 92, or an image of the reversed can 93 included in the plurality of normal cans 91 along with the coordinates of the reversed can 93 and information indicating that it is the reversed can 93.

Introducing learned model generated by using the teaching data into a small computer equipped with an FPGA or the like allows the detection device 56 to be disposed as an edge device in a factory in which the conveyance device 10 or the like is installed. The detection device 56 may be connected to a network and may be configured to allow the model to be reorganized, relearned, reimplemented, or the like by remote control.

The detection device 56 detects, for example, the fallen can 92 in accordance with the image acquired from the imaging device 52, and outputs information relating to the coordinates of the detected fallen can 92 and information indicating that it is the fallen can 92. Further, the detection device 56 detects, for example, the reversed can 93 in accordance with the image acquired from the imaging device 52, and outputs information relating to the coordinates of the detected reversed can 93 and information indicating that the reversed can 93 is the reversed can 93. That is, the detection device 56 detects the abnormal can 90, categorizes the posture of the can 90, identifies the coordinates of the can 90, and outputs these pieces of information.

The conveyance system 1 includes, downstream of the imaging device 52, a rejection device 30 for rejecting, for example, the fallen can 92 and the reversed can 93 from the conveyance device 10. The rejection device 30 includes a transfer device 31. In the rejection device 30, the conveyance device 10 is provided with a gap 32 formed to separate the conveyance surface 11. The conveyance device 10 upstream of the gap 32 is referred to as an upstream conveyance device 16, and the conveyance device 10 downstream of the gap 32 is referred to as a downstream conveyance device 17. The transfer device 31 operates under the control of the control device 40. The control device 40 uses the information output from the detection device 56 to control the transfer device 31.

The transfer device 31 sucks the bottom of the normal can 91 having the inverted posture from above to hold the normal can 91 in the upstream conveyance device 16, transfers the normal can 91 in the conveyance direction across the gap 32, and places the normal can 91 on the downstream conveyance device 17 of the conveyance device 10. On the other hand, the transfer device 31 does not suck or hold, under the control of the control device 40, the fallen can 92 and the reversed can 93, and the cans surrounding those cans. As a result, the cans including the fallen can 92 and the reversed can 93 that have not been held by the transfer device 31, drop into the gap 32, and are rejected from the conveyance device 10. In this way, the control device causes the rejection device 30 to reject at least one of the cans 90 including the can 90 not having the inverted posture in accordance with the coordinates of the fallen can 92, the reversed can 93, or the like identified by the detection device 56.

Figure 2:
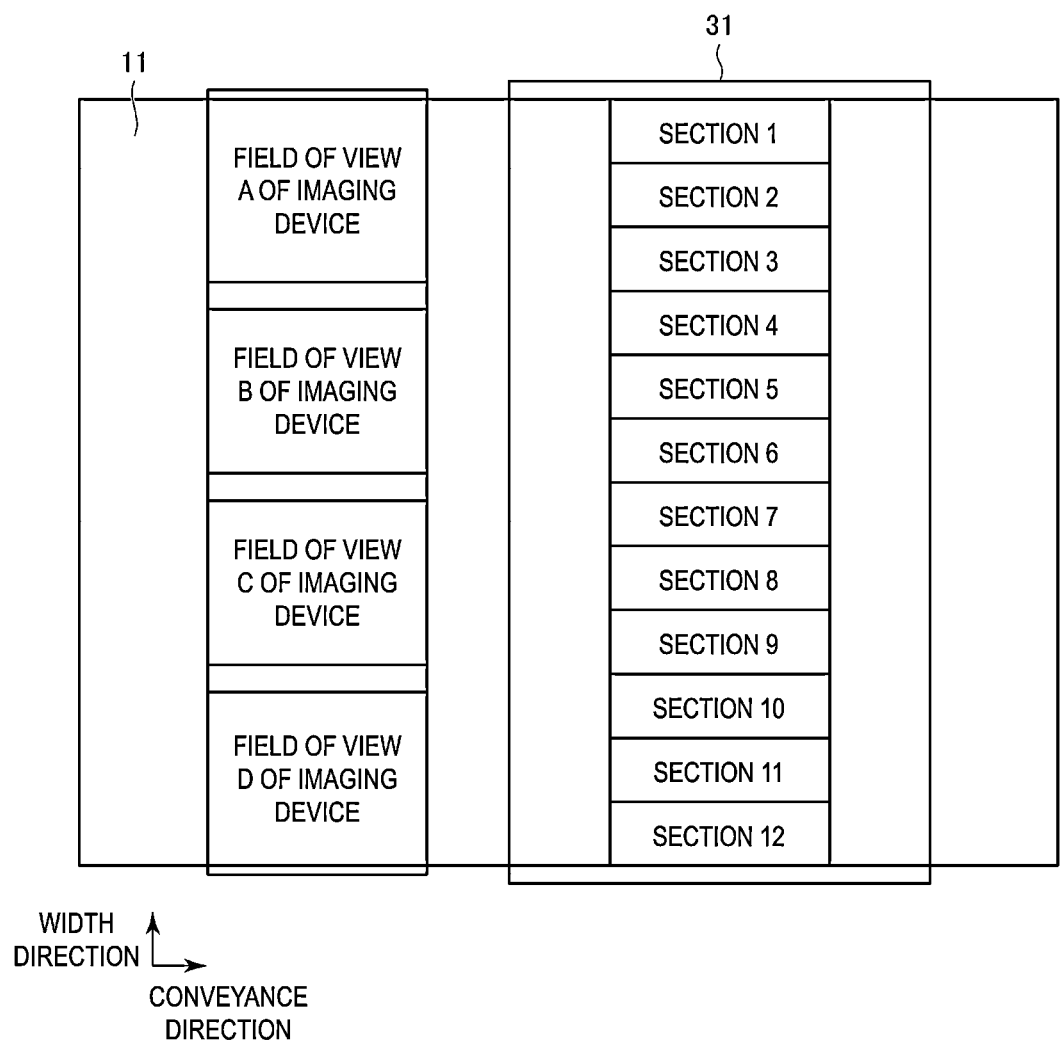
FIG. 2 is a schematic plan view for describing sections of a transfer device according to an embodiment.

The rejection device 30 will be further described with reference to FIG. 2. FIG. 2 is a schematic plan view for describing sections of the transfer device 31. The transfer device 31 has a plurality of sections in the width direction. In an example illustrated in FIG. 2, twelve sections are provided. Any number of sections may be provided. The transfer device 31 is configured to switch, for each of the sections, between whether sucking is performed, that is, whether the cans are transferred.

In the example illustrated in FIG. 2, images of the entire region of the conveyance surface 11 in the width direction are captured by fields of view A to D of four imaging devices 52, and these images are analyzed by the detection device 56. As a result, when the fallen can 92 or the reversed can 93 is present, the position thereof in the width direction is identified by the detection device 56. The control device 40 controls, in accordance with the coordinates identified by the detection device 56, in which section of the sections 1 to 12 the can 90 is transferred by the transfer device 31 and in which section of the sections 1 to 12 the can 90 is not transferred by the transfer device 31.

When the fallen can 92, the reversed can 93, or the like is not detected and only the normal cans 91 are present, the control device 40 causes the transfer device 31 to transfer the cans 90 in all the sections 1 to 12, causes the rejection device 30 not to reject any of the cans 90, and causes all of the cans 90 to be conveyed. On the other hand, when, for example, the fallen can 92 or the reversed can 93 is detected at a position corresponding to the section 5 of the field of view B, the control device 40 causes, at a timing at which the fallen can 92 or the reversed can 93 passes and before and after the timing, the transfer device 31 to stop transferring the cans 90 in the sections 3 to 7 and continue transferring the cans 90 in the sections 1 to 2 and 8 to 12, for example.

For example, the fallen can 92, whose bottom does not face upward, is not sucked by the transfer device 31 even by operation of the transfer device 31, and thus the fallen can 92 drops into the gap 32. Thus, rejecting only the fallen can 92 does not need the control as described above. However, if the fallen can 92 that is not in a normal state is present, the normal cans 91 surrounding the fallen can 92 may be, for example, contaminated. Thus, in the present embodiment, when the fallen can 92 is detected, the normal cans 91 surrounding the fallen can 92 are also rejected.

Depending on the posture of the can 90, such as a difference between the fallen can 92 and the reversed can 93, a possible range over which cans 90 surrounding the can 90 is contaminated may vary. Thus, the control device 40 may cause, in accordance with the posture of the can 90 output by the detection device 56, the rejection device 30 to change a range over which the cans 90 are rejected.

A configuration in which the transfer device 31 is not divided into the sections as in this example and transfer is stopped over the entire region in the width direction may be conceivable. In contrast, the configuration capable of controlling whether transfer is performed for each section as in the present embodiment allows only the necessary and sufficient number of the cans 90 that may be, for example, contaminated to be rejected, resulting in yield improvement.

As described above, the cans 90 not having the inverted posture, such as the fallen can 92 and the reversed can 93, and cans 90 that surround the can 90 and may be contaminated are rejected by the rejection device 30, and only the other normal cans 91 are conveyed further downstream by the conveyance device 10, and supplied to a subsequent process.

Operation of System

Operation of the conveyance system 1 will be described. The conveyance device 10 continuously operates to convey objects to be conveyed placed on the conveyance surface 11 in the conveyance direction. Although the conveyance device 10 has the gap 32 in the middle, the objects to be conveyed are transferred across the gap 32 by the transfer device 31, and thus the objects to be conveyed are continuously conveyed from upstream to downstream. On the upstream of the conveyance device 10, the cans 90 are sequentially supplied onto the conveyance surface 11 of the conveyance device 10. The washer machine 20 provided in the middle of the conveyance device 10 also operates continuously. The washer machine 20 sequentially washes the cans 90 that are being conveyed by the conveyance device 10, by a predetermined operation.

The imaging device 52 of the detection system 50 provided downstream of the washer machine 20 continuously or intermittently captures an image of a state on the conveyance surface 11 of the conveyance device 10 so that an image of all the cans 90 that are being conveyed is captured. The imaging device 52 transmits the captured image to the detection device 56 via the PoE hub 54. The detection device 56 detects, in accordance with the image received from the imaging device 52, the can 90 not having the predetermined posture, that is, the can 90 not having the inverted posture with a bottom facing upward.

Figure 3:
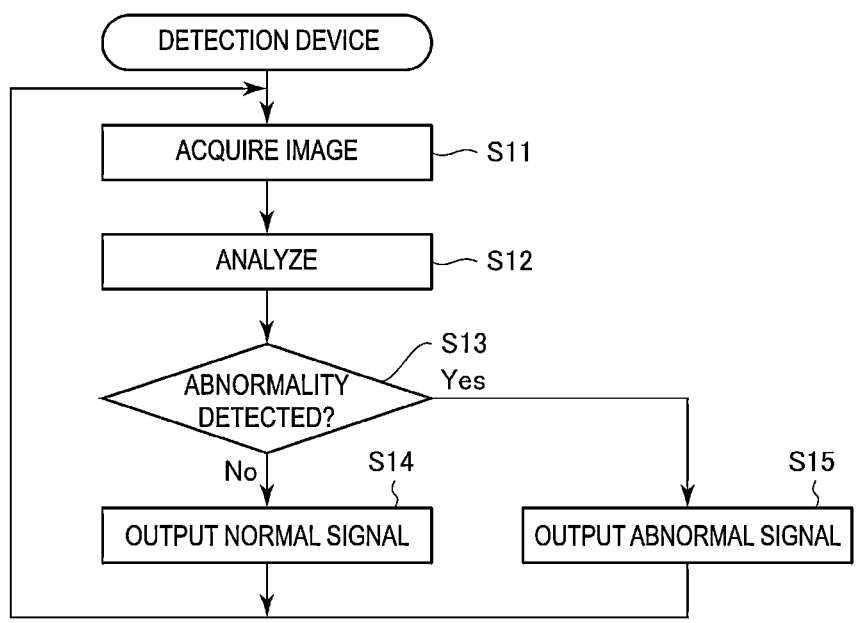
FIG. 3 is a flowchart schematically illustrating an example of operation of a detection device according to an embodiment.

Operation of the detection device 56 will be described with reference to a flowchart illustrated in FIG. 3. At step S11, the detection device 56 acquires an image captured by the imaging device 52. At step S12, the detection device 56 inputs the acquired image into a learned model and acquires an analysis result of this model. At step S13, the detection device 56 determines whether detection of an abnormality, such as detection of the can 90 not having the predetermined posture, has been performed. When no abnormality is detected, at step S14, the detection device 56 outputs a normal signal indicating that it is normal. The processing then returns to step S11, and the above-described processing is repeated.

When, at step S13, it is determined that the abnormality has been detected, the processing proceeds to step S15. At step S15, the detection device 56 outputs an abnormal signal indicating that an abnormality has been detected. The abnormal signal includes the type of detected abnormality, for example, information indicating that the fallen can 92 or the reversed can 93 has been detected. Further, the abnormal signal includes information relating to the coordinates at which, for example, the fallen can 92 or the reversed can 93 has been detected. The processing then returns to step S11, and the above-described processing is repeated. As described above, the detection device 56 sequentially analyzes the presence or absence of abnormality of the can 90, and outputs the analysis result.

Figure 4:
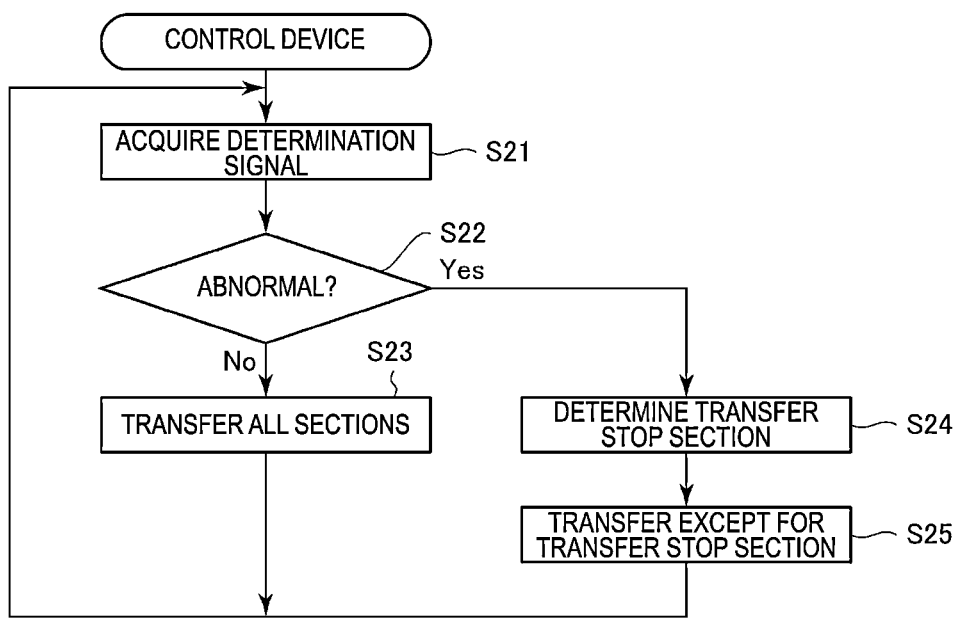
FIG. 4 is a flowchart schematically illustrating an example of operation of a control device according to an embodiment.

The transfer device 31 of the rejection device 30 operates under the control of the control device 40 to transfer the cans 90 across the gap 32 of the conveyance device 10. Control operation of the control device 40 will be described with reference to a flowchart illustrated in FIG. 4.

At step S21, the control device 40 acquires a determination signal such as the normal signal or the abnormal signal output from the detection device 56. At step S22, the control device determines whether there is an abnormality in response to the determination signal. When it is determined that there is no abnormality, at step S23, the control device 40 causes the transfer device 31 to transfer the cans 90 in all the sections. The processing then returns to step S21, and the above-described processing is repeated. That is, all the cans 90 are not rejected but conveyed in the rejection device 30 while no abnormality is detected.

When, at step S22, it is determined that there is an abnormality, the processing proceeds to step S24. At step S24, the control device 40 determines, in response to the abnormal signal, the section in which the transfer device 31 is caused to stop transferring the can 90. For example, the control device 40 determines, as a transfer stop section, a section that is centered on the coordinates at which the fallen can 92 or the reversed can 93 has been detected and includes a predetermined range for the fallen can 92 or a predetermined range for the reversed can 93.

At step S25, the control device 40 causes the transfer device 31 to transfer the cans 90 in the sections other than the determined transfer stop section, and causes the transfer device 31 to stop transferring the can 90 in the transfer stop section. As a result, in the rejection device 30, the cans 90 in the sections other than the transfer stop section are transferred across the gap 32 from the upstream conveyance device 16 to the downstream conveyance device 17, and subsequently continued to be conveyed by the downstream conveyance device 17. On the other hand, the cans in the transfer stop section drop into the gap 32, are rejected, and are not conveyed afterward.

According to the above-described operation, when the can 90 not having the predetermined posture, such as the fallen can 92 or the reversed can 93, is generated in the washer machine 20, the can 90 not having the predetermined posture and cans 90 that surround the can 90 and may be contaminated are rejected by the rejection device 30, and only the cans 90 having the predetermined posture and the cans that are unlikely to be contaminated are conveyed downstream. As a result, in, for example, a printing process performed after the washing process, repelling of ink due to contamination or the like can be prevented, and thus a defective product can be prevented from being created.

EXAMPLE

Figure 5:
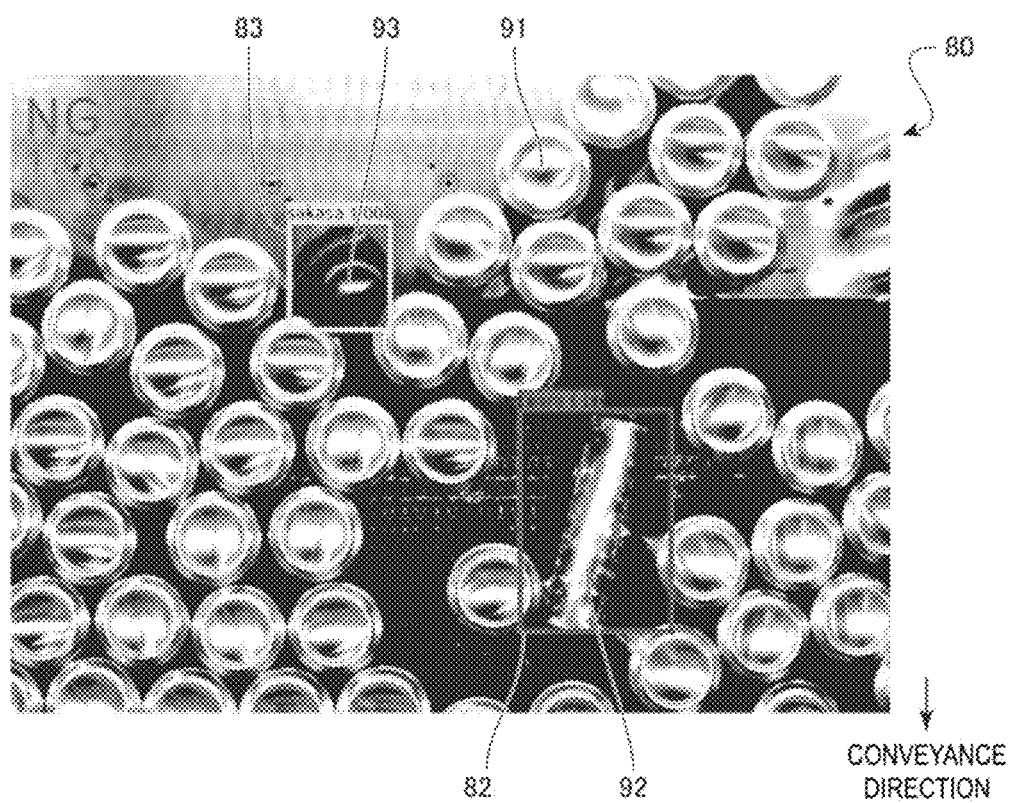
FIG. 5 is a diagram illustrating an example of an image captured by an imaging device according to an embodiment and a detection example.

FIG. 5 illustrates an example of an image 80 captured by the imaging device 52 and a detection example. Objects appearing circular in the image 80 are the bottoms of the normal cans 91. The fallen can 92 and the reversed can 93 that are mixed with the normal cans 91 are detected by the detection device 56 as indicated by a square 82 indicating the fallen can and a square 83 indicating the reversed can.

In this way, it was confirmed that the abnormality can be appropriately detected by inputting the image captured by the imaging device 52 into the detection device 56 with the learned model introduced. Further, it was confirmed that rejection can be appropriately performed by the rejection device 30 by using the detection result by the detection device 56 and that only good products can be manufactured with high efficiency.

The conveyance system 1 of the present embodiment detects the abnormal can 90 in accordance with the image captured by the imaging device 52. Alternatively, it is also conceivable that a sensor, such as an ultrasonic sensor or an optical sensor, is used to detect the fallen can 92 or the like. However, to detect a plurality of the cans 90 arranged in the conveyance direction and in the width direction, installing a large number of sensors is necessary. In particular, when the cans 90 are irregularly arranged in the conveyance direction and in the width direction as in the present embodiment, a larger number of sensors may be required than those required when the cans 90 are regularly arranged. In contrast, the analysis based on the images as in the present embodiment allows information covering a wide range to be efficiently acquired with a small number of cameras.

In the detection using the sensor as described above, the fallen can 92 can be relatively easily detected because the height thereof is different from that of the normal can 91, but in, for example, detection of the reversed can 93 in which water is contained, erroneous detection is likely to occur. In contrast, the present embodiment can detect the reversed can 93 in which water is contained with high accuracy.

Further, the detection using the sensors as described above needs the sensor to be adjusted every time the condition of the can 90 changes, for example, when a manufacturing set-up is switched to manufacture the can 90 having a different height. In particular, such an adjustment is necessary for all the large number of sensors that need to be provided as described above. In contrast, the present embodiment can relatively easily create a model capable of detecting an abnormality of the cans 90 having different heights, and even when the cans 90 to be manufactured are changed, the change can be coped with by simply changing the model to be introduced into the detection device 56.

The conveyance system 1 of the present embodiment includes the rejection device 30 in cooperation with the detection system 50, and thus the can 90 that may cause the defective product can be efficiently rejected without any manpower. In particular, the rejection device 30 enables rejection of the can 90 for each section in the width direction, thus can reject only the necessary number of cans 90, reducing wasteful rejection and achieving high yield. Furthermore, the range of the cans 90 to be rejected or the like can be adjusted in accordance with the posture or the like of the can 90 having an abnormal posture, enabling more appropriate rejection of the cans 90.

The detection device 56 of the present embodiment detects the abnormal can by using the learned model, thus relatively easily achieving highly accurate detection of various states, which has been difficult to achieve by using the known rule-based detection.

Although the disclosure has been described above with reference to the preferred embodiment, the disclosure is not limited only to the embodiment described above, and various modifications can be made within the scope of the disclosure.

For example, even a configuration in which the transfer device 31 is not divided into the sections and transfer is stopped over the entire region in the width direction, which degrades the yield, can selectively reject the cans 90 including the fallen can 92 or the reversed can 93, allowing the cans 90 including the cans 90 that may be contaminated to be rejected. Further, even if the operation of the rejection device 30 is not controlled in accordance with the output from the detection device 56, the fallen can 92 or the like may be rejected by the rejection device 30. At that time, the cans 90 or the like surrounding the detected fallen can 92 may be removed, for example, manually, in accordance with a notification of the detection result by the detection device 56. A rejection device is not limited to the rejection device 30 configured to drop the rejected can 90 into the gap 32, and any of various aspects of rejection devices may be used. The detection device 56 is not limited to the device using the learned model and may operate with various programs capable of detecting the can 90 not having the predetermined posture. The conveyance system 1 may be introduced at any location in a can manufacturing process. Not only in the washer machine 20 but also in, for example, a process in which gas or liquid is sprayed, the posture of the can 90 is likely to change, and thus the imaging device 52 may be provided downstream of that process. In addition to such a process, the imaging device 52 may be provided at any location. For example, the present technology may be used in a process in which the cans 90 are regularly arranged on the conveyance surface 11. The conveyance system 1 is not only applied to the manufacturing of cans, but may also be applied to manufacturing processes of resin containers, such as PET bottles, and other containers.

The contents of the documents described in this description and the description of the Japanese application that is the basis of Paris priority of the present application are all incorporated herein.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:
1. A conveyance system, comprising:
a conveyance device configured to convey a plurality of containers having a bottomed cylindrical shape arranged in a conveyance direction and in a width direction orthogonal to the conveyance direction;

an imaging device configured to capture an image of the containers that are being conveyed by the conveyance device;

a detection device configured to detect, by using the image, a container not having a predetermined posture of a plurality of the containers that are being conveyed;

a rejection device configured to selectively reject the containers from the conveyance device; and a control device configured to control operation of the rejection device, wherein the control device causes the rejection device to reject at least the container not having the predetermined posture in accordance with a detection result of the detection device, the conveyance device has a shape of a platform continuously extending in the conveyance direction and is configured to have the containers mounted thereon and convey the containers in the conveyance direction, the predetermined posture is an inverted posture with a bottom facing upward, and the rejection device is configured to move the containers not to be rejected in the conveyance direction across a gap provided in the platform of the conveyance device by sucking the containers from above and to drop the container to be rejected into the gap.

2. The conveyance system according to claim 1, wherein the conveyance device is configured to convey, with the containers irregularly arranged in the conveyance direction and in the width direction, the containers in the conveyance direction.

3. The conveyance system according to claim 1, wherein the rejection device is configured to reject the containers per section in the width direction, the detection device identifies coordinates in the width direction of the container not having a predetermined posture, and the control device causes the rejection device to reject at least one container including the container not having a predetermined posture in accordance with the coordinates identified by the detection device.

4. The conveyance system according to claim 3, wherein the detection device is configured to categorize and output a posture of the container not having a predetermined posture, and the control device controls the rejection device by also using information on the posture categorized.

5. The conveyance system according to claim 1, further comprising a spraying device provided in the conveyance device and configured to spray fluid onto the containers that are being conveyed, wherein the imaging device is provided downstream of the spraying device.

6. The conveyance system according to claim 1, wherein the detection device implements a model that is machine-learned to determine postures of the containers.

7. A conveyance system, comprising:

a conveyance device configured to convey a plurality of containers having a bottomed cylindrical shape arranged in a conveyance direction and in a width direction orthogonal to the conveyance direction;

an imaging device configured to capture an image of the containers that are being conveyed by the conveyance device;

a detection device configured to detect, by using the image, a container not having a predetermined posture of a plurality of the containers that are being conveyed; and a spraying device provided in the conveyance device and configured to spray fluid onto the containers that are being conveyed, wherein the imaging device is provided downstream of the spraying device.

8. The conveyance system according to claim 7, wherein the conveyance device is configured to convey, with the containers irregularly arranged in the conveyance direction and in the width direction, the containers in the conveyance direction.

9. The conveyance system according to claim 7, further comprising:

a rejection device configured to selectively reject the containers from the conveyance device; and a control device configured to control operation of the rejection device, wherein the control device causes the rejection device to reject at least the container not having the predetermined posture in accordance with a detection result of the detection device.

10. The conveyance system according to claim 7, wherein the detection device implements a model that is machine-learned to determine postures of the containers.

11. A conveyance system, comprising:

a conveyance device configured to convey a plurality of containers having a bottomed cylindrical shape arranged in a conveyance direction and in a width direction orthogonal to the conveyance direction;

an imaging device configured to capture an image of the containers that are being conveyed by the conveyance device; and a detection device configured to detect, by using the image, a container not having a predetermined posture of a plurality of the containers that are being conveyed; wherein the detection device implements a model that is machine-learned to determine postures of the containers, the predetermined posture is an inverted posture with a bottom facing upward, the model is generated by supervised learning using, as teaching data, at least images of the containers having the inverted posture, images of the containers having an upright posture with a bottom facing downward, and images of the containers having a fallen posture and is configured to determine at least the inverted posture, the upright posture, and the fallen posture of the containers.

12. The conveyance system according to claim 11, wherein the conveyance device is configured to convey, with the containers irregularly arranged in the conveyance direction and in the width direction, the containers in the conveyance direction.

13. The conveyance system according to claim 11, further comprising:

a rejection device configured to selectively reject the containers from the conveyance device; and a control device configured to control operation of the rejection device, wherein the control device causes the rejection device to reject at least the container not having the predetermined posture in accordance with a detection result of the detection device.

14. The conveyance system according to claim 11, further comprising
a spraying device provided in the conveyance device and configured to spray fluid onto the containers that are being conveyed, wherein
the imaging device is provided downstream of the spraying device.

15. The conveyance system according to claim 11, wherein
the model is configured to output coordinates in the images of the container not having the predetermined posture.

* * * * *